United States Patent
Nicolas et al.

(10) Patent No.: US 7,139,423 B1
(45) Date of Patent: Nov. 21, 2006

(54) METHOD FOR BUILDING A THREE-DIMENSIONAL SCENE BY ANALYZING A SEQUENCE OF IMAGES

(75) Inventors: Yannick Nicolas, Rennes (FR); Philippe Robert, Thorigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 574 days.

(21) Appl. No.: 09/831,992

(22) PCT Filed: Sep. 14, 2000

(86) PCT No.: PCT/FR00/02537

§ 371 (c)(1),
(2), (4) Date: Aug. 16, 2001

(87) PCT Pub. No.: WO01/22366

PCT Pub. Date: Mar. 29, 2001

(30) Foreign Application Priority Data

Sep. 17, 1999 (FR) .................................. 99 11671

(51) Int. Cl.
*G06K 9/00* (2006.01)
*G06K 9/36* (2006.01)

(52) U.S. Cl. ............... 382/154; 382/106; 382/236

(58) Field of Classification Search ............... 382/106, 382/107, 154, 174, 236; 345/420, 428
See application file for complete search history.

(56) References Cited

U.S. PATENT DOCUMENTS

| 5,511,153 A | 4/1996 | Azarbayejani et al. ...... 395/119 |
| 5,818,959 A * | 10/1998 | Webb et al. ................. 382/154 |
| 6,124,864 A * | 9/2000 | Madden et al. ............. 345/473 |
| 6,208,347 B1 * | 3/2001 | Migdal et al. ............... 345/419 |
| 6,278,460 B1 * | 8/2001 | Myers et al. ................ 345/424 |
| 6,668,082 B1 * | 12/2003 | Davison et al. ............. 382/190 |
| 6,731,283 B1 * | 5/2004 | Navab ......................... 345/424 |

FOREIGN PATENT DOCUMENTS

EP 735 512 A2 10/1996

OTHER PUBLICATIONS

David K. McAllister, Lars Nyland, Voicu Popescu, Anselmo Lastra, Chris McCue, "Real-Time Rendering of Real World Environments", Rendering Techniques '99, Proceedings of the Eurographics Workshop on Rendering, (Granada, Spain), Jun. 21-23, 1999.*

(Continued)

*Primary Examiner*—Bhavesh M. Mehta
*Assistant Examiner*—Wes Tucker
(74) *Attorney, Agent, or Firm*—Joseph J. Laks; Ronald H. Kurdyla

(57) ABSTRACT

The process comprises the following steps: calculating, for an image, a depth map corresponding to the depth, in the three-dimensional space, of image pixels; calculating, for an image, a resolution map corresponding to the three-dimensional resolution of the image pixels, based on the depth map; matching a current image pixel with a pixel of another image of the sequence, pixels relating to a common point in the three-dimensional scene, by projecting the current image pixel onto the other image; selecting a current image pixel according to its resolution and to that of the pixels of the sequence matched with this said pixel; constructing the three-dimensional model from the selected pixels. One application concerns the generation of images for browsing.

11 Claims, 2 Drawing Sheets

OTHER PUBLICATIONS

Le Roux, L.J.; van Schalkwyk, J.J.D. "An overview of moving object segmentation in video images", Communications and Signal Processing, 1991. COMSIG 1991. Proceedings., South African Symposium on , Aug. 30, 1991 pp. 53-57.*

M. Pollefeys, R. Koch, M. Vergauwen and L. Van Gool, "Metric 3D Surface Reconstruction from Uncalibrated Image Sequences", Proc. SMILE Workshop (post-ECCV'98), LNCS 1506, pp. 138-153, Springer-Verlag, 1998.*

J. K. Aggarwal et al., *Determining Motion Parameters Using Intensity Guided Range Sensing*," printed 1986 in "Pattern Recognition", Great Britain, vol. 19, pp. 169-180.

Search Report *.

* cited by examiner

METHOD FOR BUILDING A THREE-DIMENSIONAL SCENE BY ANALYZING A SEQUENCE OF IMAGES

This application claims the benefit under 35 U.S.C. § 365 of International Application PCT/FR00/02537, filed Sep. 14, 2000, which was published in accordance with PCT Article 21(2) on Mar. 29, 2001 in French, and which claims the benefit of French Application No. 99/11671, filed Sep. 17, 1999.

BACKGROUND OF THE INVENTION

1. Field of the Invention

The invention relates to a process for constructing a 3D scene model by analysing image sequences.

The domain is that of the processing of image sequences and the modelling of real static scenes in a navigation context. The sequence consists of images relating to static scenes within which the viewpoint, that is to say the camera, changes.

The objective is to allow a user to navigate virtually in a real scene. However, the data regarding the scene consist of image sequences which may represent an enormous quantity of information. These sequences must be processed in such a way as to provide, a compact representation of the scene, which can be used in an optimal manner for navigation, that is to say allows interactive rendition, with controlled image quality. The problem is to obtain a high rate of compression whilst avoiding the techniques of inter-image predictive type which are not suited to navigation.

2. Description of Prior Art

Various representations of scenes currently exist. It is possible to distinguish mainly:

- representations based on 3D models, in which the geometry of the scene is generally represented in the form of plane facets with which texture images are associated. This modelling is much used to represent synthetic scenes obtained via software of the CAD (computer aided design) type. On the other hand, it is still little used to represent real scenes, since it is complex. The current methods use few images, generally photographs, and the resulting representations are not very detailed and lack realism.
- non-3D representations obtained for example on the basis of the QuickTime VR software (Trademark of the Apple company). The data of the scene are acquired in the form of panoramic shots with transition image sequences for switching from one panoramic shot to another. Such a representation considerably limits the possibilities of navigation in the virtual scene.

SUMMARY OF THE INVENTION

The aim of the invention is to alleviate the aforesaid drawbacks. Its subject is a process for constructing a 3D scene model by analysing image sequences, each image corresponding to a viewpoint defined by its position and its orientation, characterized in that it comprises the following steps:

- calculation, for an image, of a depth map corresponding to the depth, in 3D space, of the pixels of the image,
- calculation, for an image, of a resolution map corresponding to the 3D resolution of the pixels of the image, from the depth map,
- matching of a pixel of a current image with a pixel of another image of the sequence, pixels relating to one and the same point of the 3D scene, by projecting the pixel of the current image onto the other image,
- selection of a pixel of the current image depending on its resolution and on that of the pixels of other images of the sequence matched with this pixel,
- construction of the 3D model from the selected pixels.

According to a particular embodiment, the process is characterized in that the selected pixels of an image constitute one or more regions, weights are calculated and allocated to the pixels of the image depending on whether or not they belong to the regions and on the geometrical characteristics of the regions to which they belong in the image and in that a new selection of the pixels is performed depending on the resolution and weight values assigned to the pixels.

According to a particular embodiment, which can be combined with the previous one, the process is characterized in that a partitioning of the images of the sequence is performed by identifying, for a current image, the images whose corresponding viewpoints have an observation field possessing an intersection with the observation field relating to the current image, so as to form a list of images associated therewith, and in that the other images of the sequence for which the matching of the pixels of the current image is performed are the images of its list.

The partitioning of the images of the sequence can be performed by removing from the list associated with an image, the images which possess too few pixels corresponding to those of the current image.

The invention also relates to a process of navigation in a 3D scene consisting of creating images as a function of the movement of the viewpoint, characterized in that the images are created on the basis of the process for constructing the 3D model previously described.

The image sequences represent a very considerable quantity of data with high inter-image redundancy. The use of a 3D model which is the best model for representing a real static scene and the matching of the images via simple geometric transformations make it possible to broadly identify the inter-image redundancy. This model in fact makes it possible to take account of a large number of images. Moreover it requires no motion compensation operations at 2D image level.

A better compromise between compactness, that is to say compression of the data to be stored and processed, interactivity and quality of rendition is achieved: despite the high rate of compression, the process provides images of good quality and allows great flexibility and speed in navigation.

The invention makes it possible to obtain better realism than that obtained with the current 3D modelling techniques as well as better flexibility than that obtained with the conventional techniques for image coding.

BRIEF DESCRIPTION OF THE DRAWINGS

The characteristics and advantages of the present invention will become more clearly apparent from the following description, given by way of example and with reference to the appended figures where.

The acquisition of the data of the real scene is intimately related to the representation envisaged. In our example, we consider the situation where the images are acquired by a standard camera, at the video rate, and the camera movement is produced in a manner corresponding to the paths scheduled during utilization. In this context, the construction of a representation of a scene from image sequences may be likened to the techniques of image coding.

The principle of constructing the representation of a scene is to select the necessary and sufficient data for reconstructing the images of the sequence with controlled quality. The procedure consists in comparing the images one by one so as to select the regions having the best relevance, a parameter which depends on the resolution and on the cost of description. In fact, the comparison is performed at the pixel level: the basic criterion for the comparison and selection of the pixels is the resolution of the 3D local surface associated with each pixel.

We assume that by suitable processing, known from the prior art, we obtain, for each viewpoint, its 3D position in a reference frame associated with the scene (position and orientation of the viewpoint), as well as a depth map associated with the image relating to the viewpoint. The object of the next phase is to construct a compact representation of all of these data which is suitable for navigation.

Figure 1:
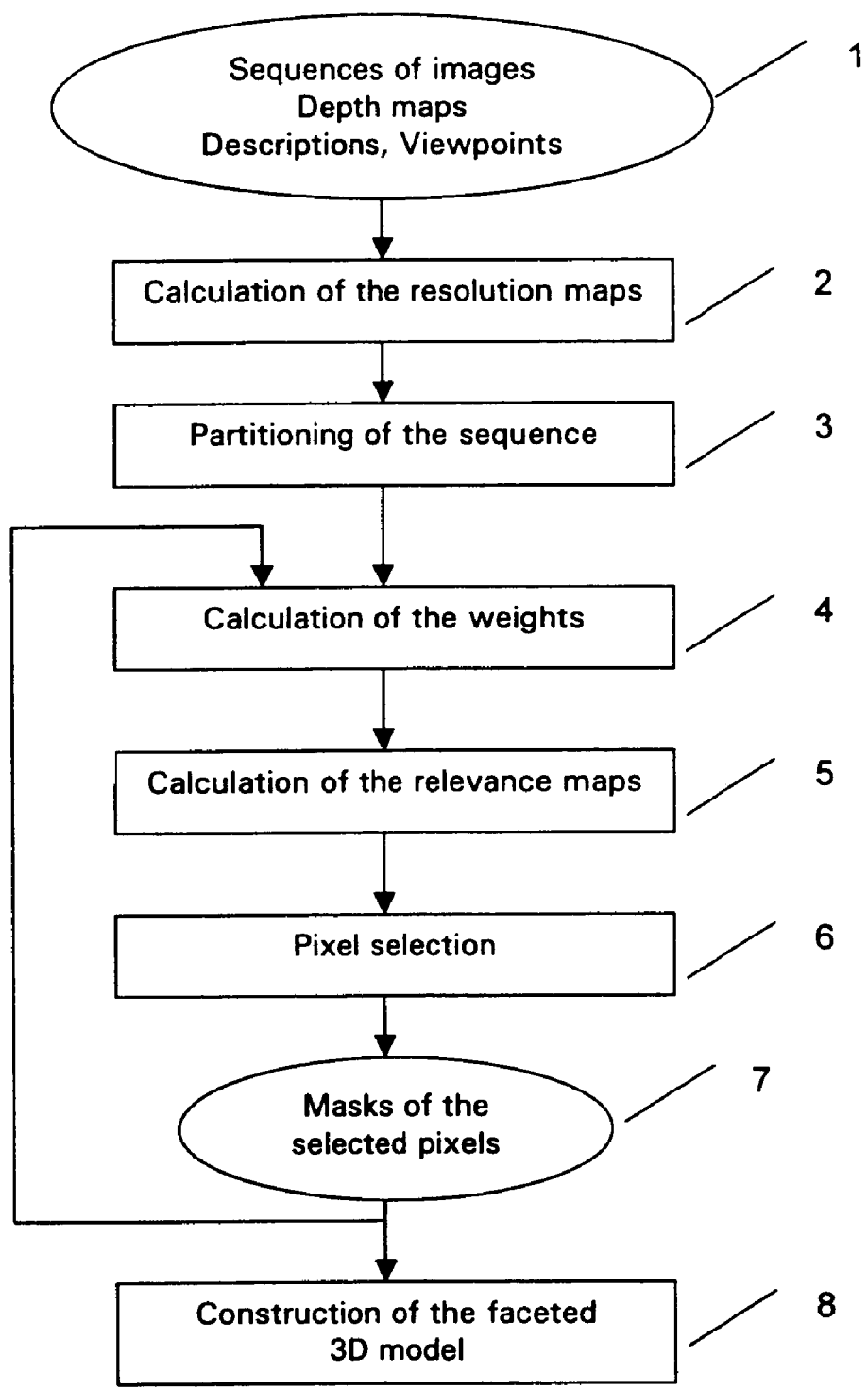
FIG. 1 represents a processing algorithm describing the steps of a process according to the invention.

FIG. 1 represents a flow chart describing the various steps of the process according to the invention.

At the system input, reference 1, we have data relating to an image sequence acquired by a camera moving within a real static scene as indicated earlier. However, it is entirely conceivable for certain moving objects to be present in the image. In this case, specific processing identifies these objects which are then marked so as to be ignored during subsequent processing. An ad hoc processing provides, for each image, a depth map as well as the position and the orientation of the corresponding viewpoint. There is no depth information in the zones corresponding to deleted moving objects.

A resolution value is calculated for each pixel of each image, this being step 2. A first and a second partitioning are then carried out during step 3. Step 4 performs a weight calculation for providing, step 5, relevance values allocated to the pixels. The next step 6 carries out a selection of the pixels depending their relevance. A sequence of masks of the selected pixels is then obtained for the image sequence, in step 7. After this step 7, steps 4 to 7 are repeated so as to refine the masks. These steps are repeated until the masks no longer change significantly. So then, step 8 is undertaken so as to carry out the construction of the faceted 3D model from the selected pixels alone.

DETAILED DESCRIPTION

The various steps are now explained in detail.

Available at the system input, for each image of the sequence, is a depth map as well as the position and the orientation of the corresponding viewpoint.

Step 2 consists in a calculation, for each pixel of an image, of a resolution value giving a resolution map for the image.

The resolution at each pixel provides an indication of the level of detail of the surface such as it is viewed from the current viewpoint. It may be, for example, calculated over a block of points centred on the pixel and corresponds to the density of points in the scene, that is to say in 3D space, which relate to this block.

In one example, a window of 7×7 pixels, centred on the image pixel for which the resolution is calculated, is utilized. For each of the pixels belonging to this window, the depth information is processed so as to determine, from the distribution in 3D space of the points around the processed pixel, the 3D resolution: a distribution of the points over a large depth will give a inferior resolution than a distribution of the points over a small depth. After processing all the pixels of the image, a resolution map of the image is obtained for each of the images of the sequence.

The process then carries out, step 3, a partition of the sequence.

The navigation phase consists in interpolating the image of the current viewpoint from the 3D model. The model may be very large, and it is therefore useful to partition it so as to limit the quantity of information to be processed at each instant for the reconstruction of a viewpoint. Indeed, it is important for the images to be interpolated in a limited time so as to guarantee good fluidity of navigation. Moreover, the comparison of the images pixel by pixel in the data selection phase 6, described later, is an unwieldy operation, in particular if the sequences are long. This remark also holds for a partitioning, performed as early as possible, to reduce the quantity of calculations.

Two partitioning operations are in fact performed to limit the manipulation of the data, both in the phase of construction of the representation and in the utilization phase (navigation).

A first partitioning of the sequence is performed by identifying the viewpoints having no intersection of their observation fields. This will make it possible to avoid comparing them, that is to say comparing the images relating to these viewpoints, during subsequent steps. Any intersections between the observation fields, of pyramidal shape, of each viewpoint, are therefore determined by detecting the intersections between the edges of these fields. This operation does not depend on the content of the scene, but only on the relative position of the viewpoints. With each current image there is thus associated a set of images whose observation field possesses an intersection with that of the current image, this set constituting a list.

A projection is performed during this partitioning step 3 allowing a second partitioning. For each image group, a projection similar to that described later with regard to step 6, is carried out so as to identify the matching pixels. If an image has too few pixels matching with the pixels of an image of its list, this image is deleted from the list.

These partitionings, for each viewpoint, result in a list or group of viewpoints having 3D points in common with it, and which will therefore be compared during the selection of the pixels so as to reduce the redundancy. An array is constructed so as to identify, for each image of the sequence, the selected images required for its reconstruction.

During projection, the pixels having no match are marked by setting the resolution value, for example, to 1. By virtue of this particular marking, it will be evident, during step 6, that it is not necessary to re-project these pixels for the search for the matching pixels. This projection operation is in fact repeated in step 6 so as to avoid storing the information relating to these matches, obtained during step 3, this information representing a very large number of data.

Step 4 consists of a weight calculation for each of the pixels of an image. This parameter is introduced so as to take into account the cost of the pixels preserved. In the absence of any additional constraint on the selecting of the pixels, the latter may constitute regions of diverse sizes and diverse shapes and the cost of describing these regions may be high. To avoid this problem, a weight which takes into account the classification of the pixels in the close environment (pixel selected or not selected) is associated with each pixel. The weight can be chosen in such a way as to penalize the region's small size or more coarsely, the images having few selected points. In this case, this may be one value per image, for example the percentage of selected points. It is also possible to apply morphological filters to the mask describing the regions of selected points so as to reduce the complexity of their shape and hence reduce the cost of description.

The criteria which may be taken into account for the weight calculation are, for example:
- the quantity of points selected in the image
- the size of the regions
- the compactness of the regions (inversely proportional to the weight)
- the peripheral zone of the regions so as to take account for example of the spikes to be eliminated. A morphological filter may also be passed over the mask before the calculation of the weight so as to delete these peripheral zones of small area.

At the first iteration, the masks are initialized to the value 0, that is to say that all the pixels are selected by default. The weights calculated during this first pass of step 4 are therefore at the unit value. A variant consists in choosing, as weight for all the pixels of the image, during this first iteration, the percentage of points of the image having no match in the other images with respect to the number of points of the image. One thus favours the preservation of the images containing the most pixels with no match (see steps 5 et 6 for the selection of the pixels).

A relevance value combining resolution and weight is deduced during step 5. It may for example be calculated thus:

$$\text{relevance} = \text{resolution} \times (1 + \text{weight})$$

A value is allocated to each pixel to provide a relevance map per image.

Here, the objective is to obtain the maximum of points describing the scene over a minimum of images, the pixels being selected (see step 6) as a function of their relevance value.

The selecting of the pixels is the subject of step 6

Here, for each pixel, this involves a search for the match in the other viewpoints, and involves a comparison of the relevance values for the identification of the pixel having best relevance.

Figure 2:
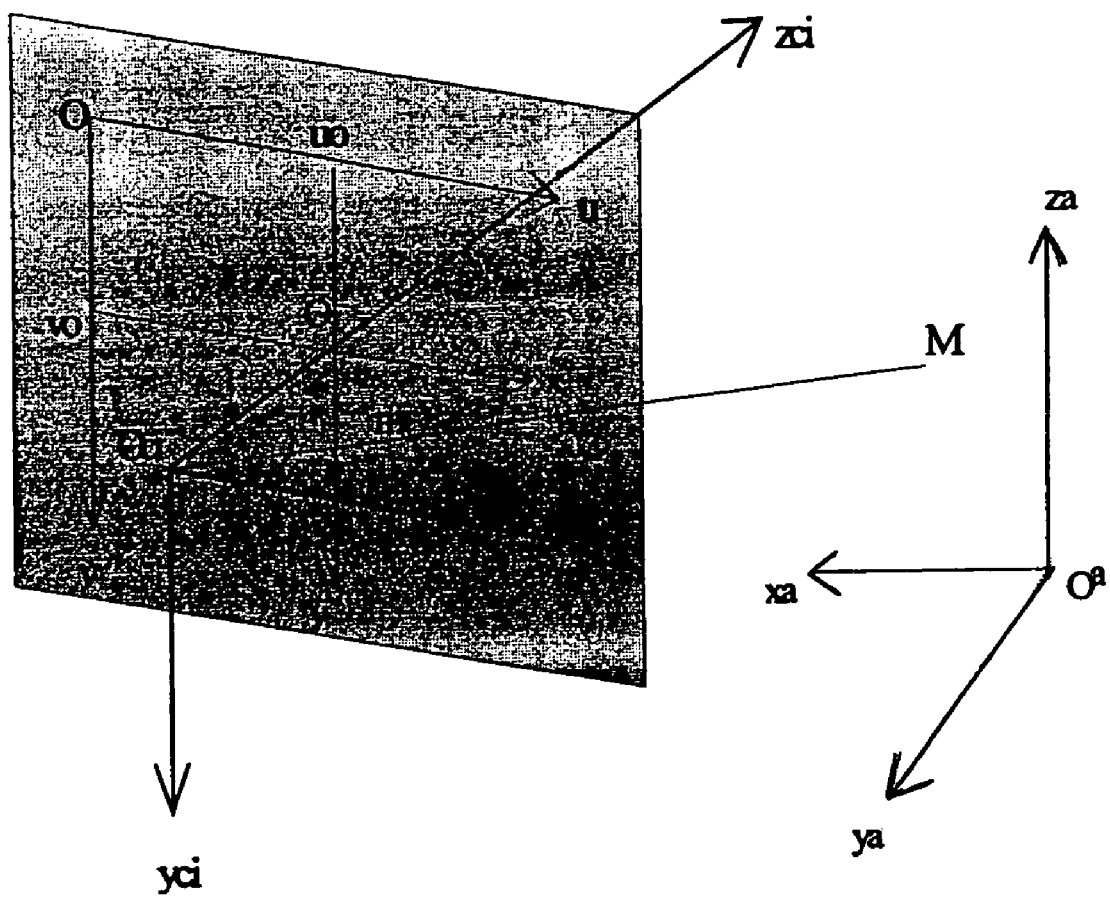
FIG. 2 represents the reference frames associated with a viewpoint.

To do this, a match between the pixels of the various images is performed by geometrical transformation. FIG. 2 describes an image reference frame (O, u, v) corresponding to an image i, that is to say an image associated with a viewpoint i, a reference frame (Oci, xci, yci, zci) tied to viewpoint i (for example Oci coincides with the position of viewpoint i) and an absolute reference frame (Oa, xa, ya, za).

For each viewpoint i, we have its position and its orientation in the absolute reference frame. Each pixel (u,v) of the image has a depth value zci(u,v) defined in the reference frame (Oci, xci, yci, zci) associated with the viewpoint i.

The geometrical transformation making it possible to pass from the image reference frame (O, u, v) to the reference frame (Oci, xci, yci, zci) tied to the viewpoint and the geometrical transformations making it possible to pass from this reference frame to the absolute reference frame (Oa,xa, ya,za) tied to the scene are known.

It is these transformations that are used to pass from one image to another, that is to say to match the pixels of one image to the pixels of another image, as indicated below.

Each pixel is the result of the projection of a point in the 3D space on the 2D image plane of the current viewpoint i. Starting from a pixel of the image i (the z component of which is known), which corresponds to any point in the scene, it is possible to determine its projection point in an image j via known geometrical transformation. If this projection point coincides with a pixel of the image, there is a matching of the pixels. Otherwise, this 2D projection point is associated with the nearest pixel. We then consider that these 2 pixels (the initial pixel and the target pixel), which relate to very close points on the same surface in the scene, are matched and their characteristics may be compared.

The matching of the pixels of one image is performed over all of the images in its list, this being the subject of the partition defined in step 3. Each pixel is projected on each of the other images of the group: it is matched with a pixel as described above. The relevance value is compared and the pixel having the worst relevance is marked. The procedure of comparing the pixel with the corresponding pixels is stopped as soon as a match having better relevance has been found.

These operations therefore make it possible to identify and eliminate the inter-image redundancy by retaining only the pixels of best relevance. However, while still reducing the redundancy, it may be advantageous to retain more of a representation of a given surface in order to avoid having to manipulate the representation at maximum resolution in order to create distant viewpoints. It is therefore advantageous to introduce a threshold into the comparison of the resolution values: if the ratio of two resolution values exceeds this threshold, none of the pixels is marked. Thus, each of the pixels can be used depending on the desired resolution, fine or coarse.

The marking of the pixels is done by firstly initializing all the pixels of all the masks, for example to the binary value 1. Each pixel is compared with its match, if it exists, in the other associated viewpoints during the partitioning phases. The one which possesses the lowest relevance is marked 0, that is to say it is rejected. Consequently, if none of its matches has a higher relevance than the current pixel, this is the one which is selected since it retains the initial marking. This therefore results, for each image of the sequence, in a binary mask or image, the pixels for which the value 1 is assigned corresponding to the selected pixels.

Step 7 collects the masks relating to each of the images forming the sequence in order to deliver the sequence of masks.

There is a feedback loop from step 7 to step 4 in order to refine the calculated relevance values. At each iteration, the weights and therefore the relevance values are recalculated from the masks obtained at the previous iteration.

The projection operations are repeated at each iteration and relate to all of the pixels of the image, pixels not selected during a previous iteration possibly being selected because, for example, of a reduction in the pertinence value of a pixel with which it is matched. However, the pixels not having a match in the other images are not projected.

To reduce the calculations, it is possible, at each iteration, to remove from the list of images which is associated with a current image the images no longer having a pixel with better relevance than the corresponding pixel in the current image. The final list of a given image thus contains the necessary and sufficient images for its reconstruction.

The iterative procedure is stopped after a predetermined number of iterations or when there are no longer any significant changes in the masks. Once these definitive masks have been obtained, step 8 follows step 7 and these masks are used in the phase of constructing the faceted 3D model, the construction being carried out on the basis of only the selected pixels defined by these masks.

The data relating to this faceted 3D model are composed of geometrical information and texture information. For each selected region, defined by the masks, its outline is polygonized and the corresponding depth map is approximated by 3D triangles. The selected texture data are grouped together so as not to retain unnecessary regions. A 3D model can easily be formed from all of this information. The list of the images and therefore the regions associated with each image can also be advantageously taken into account in the construction of the 3D model in order to partition it. This partitioning may then be used in the rendition phase in order to limit the amount of information to be processed during the image reconstruction.

The process of navigating in the 3D scene, which consists in creating images according to the movement of the viewpoint, uses all this information to recreate the images.

The invention claimed is:

1. Method for constructing a 3D scene model by analyzing image sequences, each image corresponding to a viewpoint defined by its position and its orientation, comprising the following steps:
   calculating, for each image, a depth map corresponding to the depth, in 3D space, of pixels of the image,
   calculating, for each image, a resolution map corresponding to the 3D resolution of said pixels of the image, from the depth map,
   matching a pixel of a current image with a pixel of another image of the sequence, said pixels relating to one and the same point of the 3D scene, by projecting the pixel of the current image onto the other image,
   selecting a pixel of the current image depending on its resolution and on that of the pixels of other images of the sequence matched with said pixel, and
   constructing a of the 3D model from the selected pixels.

2. Method according to claim 1, wherein the selected pixels of an image constitute one or more regions, weights are calculated and allocated to the pixels of the image depending on whether or not they belong to the regions and on the geometrical characteristics of the regions to which they belong in the image and a new selection of the pixels is performed depending on the resolution and weight values assigned to the pixels.

3. Method for constructing a 3D scene model by analyzing image sequences, each image corresponding to a viewpoint defined by its position and its orientation, comprising;
   calculation, for an image, of a depth map corresponding to the depth, in 3D space, of the pixels of the image,
   calculation, for an image, of a resolution map corresponding to the 3D resolution of the pixels of the image, from the depth map,
   matching of a pixel of a current image with a pixel of anther image of the sequence, pixels relating to one and the same point of the 3D scene, by projecting the pixel of the current image onto the other image,
   selection of a pixel of the current image depending on its resolution and on that of the pixels other images of the sequence matched with the pixel, and
   construction of the 3D model from the selected pixels;
   wherein the selected pixels of an image constitute one or more regions, weights are calculated and allocated to the pixels of the image depending on whether or not they belong to the regions and on the geometrical characteristics of the regions to which they belong in the image and a new selection of the pixels is performed depending on the resolution and weight values assigned to the pixels, and
   wherein a relevance value is assigned to each pixel of an image depending on the weight and on the resolution which have been assigned to this pixel and a selection of the pixels of a current image is performed on the basis of the highest relevance value among the matched pixels in order to give a mask of selected pixels.

4. Method according to claim 1, wherein a partitioning of the images of the sequence is performed by identifying, for a current image, the images whose corresponding viewpoints have an observation field possessing an intersection with the observation field relating to the current image, so as to form a list of images associated therewith, and in that the images belonging to the list associated with the current image are images of the sequence that are to be used in the matching of the current frame's pixels.

5. Method according to claim 4, wherein a partitioning of the images of the sequence is performed by removing, from the list associated with an image, the images which possess too few pixels corresponding to those of the current image.

6. Method according to claim 3, wherein the operations of calculating the weights, of calculating, the relevance and of selecting the pixels are repeated until the masks obtained from the selection no longer change significantly.

7. Method according to claim 3, wherein the operations of matching a pixel of the current image, by projection on the other images, are stopped for this pixel as soon as a corresponding pixel having a higher relevance value has been found.

8. Method according to claim 3, wherein the selection on the basis of the relevance values is performed when the ratio of the resolution values of the matched pixels lies within predefined limits.

9. Method according to claim 1, wherein the pixel of the other image is the pixel closest to the projection point on this other image.

10. Method according to claim 1, wherein the moving objects which move in the scene are detected in order to be extracted therefrom so as to obtain a static-type scene.

11. Method according to claim 1, further comprising the step of navigating in a 3D scene by creating images as a function of the movement of the viewpoint, wherein the images are of different viewpoints of the 3D model.

* * * * *